US00RE36926E

United States Patent [19]

Austin et al.

[11] E Patent Number: Re. 36,926

[45] Reissued Date of Patent: Oct. 31, 2000

[54] WELDING CONTROL USING FUZZY LOGIC ANALYSIS OF VIDEO IMAGED PUDDLE DIMENSIONS

[75] Inventors: Mary A. Austin, Colchester; Kenneth C. Dunne, Tolland; Dag Lindland, East Hampton, all of Conn.; Phillip L. Frey, Eden Prairie, Minn.; Dean G. Hystad, Eden Prairie, Minn.; Richard E. Nelson, Eden Prairie, Minn.; Bradley D. Warner, Minnetonka, Minn.

[73] Assignees: United Technologies Corporation, Hartford, Conn.; MTS Corporation, Eden Prairie, Minn.

[21] Appl. No.: 09/276,219

[22] Filed: Mar. 25, 1999

Related U.S. Patent Documents

Reissue of:

[64] Patent No.: 5,614,116
Issued: Mar. 25, 1997
Appl. No.: 08/332,633
Filed: Oct. 31, 1994

[51] Int. Cl.[7] ..... B23K 9/095

[52] U.S. Cl. ..... 219/130.21; 219/124.34; 700/42; 901/42

[58] Field of Search ..... 219/130.31, 124.34, 219/125.1, 137 R; 901/42; 700/42

[56] References Cited

U.S. PATENT DOCUMENTS 4,306,144 12/1981 Masaki ..... 219/124.34
4,613,743 9/1986 Nied et al. ..... 219/130.21

(List continued on next page.)

FOREIGN PATENT DOCUMENTS 246931 6/1987 Germany ..... 219/137 R
4-48576 2/1992 Japan .

(List continued on next page.)

OTHER PUBLICATIONS

Ohshima et al., "Fuzzy Expert System for Robotic Arc Welding", PED–vol. 51, Welding and Joining Processes, ASME 1991, pp. 85–90.

Boo et al., "A Fuzzy Linguistic Control Approach to the Control of Weld Pool Size in Gas Metal Arc Welding Processes", PED–vol. 51, Welding and Joining Processes, ASME 1991, pp. 73–84.

(List continued on next page.)

*Primary Examiner*—Clifford C. Shaw

[57] ABSTRACT

A welding system includes an imaging system that takes frame by frame pictures of a weld puddle. The imaging system is located in the weld torch. From the images puddle length and width are determined. The length and width are applied against stored membership functions that cover a range of different weld current characteristics and the degree of membership of each dimension in those functions is determined, producing an alpha factor for each membership function. This provides a fuzzy current requirement. Stored values for moment and area for each membership function are multiplied by the alpha for the respective function. The total of the moments is divided by the total of the areas to produce a desired weld current. The weld head includes a weld wire feeder that is driven by a servo by which the wire can be feed along either side of the weld joint. The wire feeder is gear driven in such a way that it does not interfere with the optics in the weld torch. The optics include a strobe to illuminate the puddle. Signal processing includes a process for interpolating the puddle centerline from the range in puddle widths over successive strobed images of the puddle. The head is positioned automatically over the centerline.

31 Claims, 10 Drawing Sheets

AMENDED

U.S. PATENT DOCUMENTS

| | | | |
|---|---|---|---|
| 4,724,302 | 2/1988 | Penney et al. | 219/130.21 |
| 5,270,516 | 12/1993 | Hamamoto et al. | 219/130.21 |
| 5,275,327 | 1/1994 | Watkins et al. . | |
| 5,304,768 | 4/1994 | Ishizaka . | |
| 5,305,224 | 4/1994 | Hishida et al. . | |

FOREIGN PATENT DOCUMENTS

| | | |
|---|---|---|
| 4-319079 | 11/1992 | Japan . |
| 5-42367 | 2/1993 | Japan . |
| 5-84572 | 4/1993 | Japan . |
| 5-177353 | 7/1993 | Japan . |

OTHER PUBLICATIONS

Li et al., "A Vision–Based Penetration Controller for Application to Varying Root Thichness", International Conf. Proc. on Modeling and Control of Joining Processes, Dec. 1993, pp. 369–376.

Inoue, "Welding Advances with Computer—Latest Trend of Computer Utilization in Japan", 5th International Sysmposium of Japan Welding Society, pp. 431–440.

IEEE Transactions on Robotics and Automation, vol. 8, No. 1, Feb. 1992 New York, pp. 86–93, Sundaram Nagarajan et al. "Control of the Welding Process Using Infrared Sensors".

Proceedings of the IECON 93, vol. 1, Nov. 1993 Hawaii, pp. 424–429, Yasuyoshi Kaneko et al. "Sensing of the Weld Pool Depth with Neural Network and Fuzzy Control of Seam Tracking".

Robotics and Autonomous Systems, vol. 13, No. 4, Dec. 1994 Amsterdam, NL, pp. 291–296, C.S. Wu et al. "An Auto–Programming System of MAG Welding Parameters for Vision–Based Robot".

AMENDED

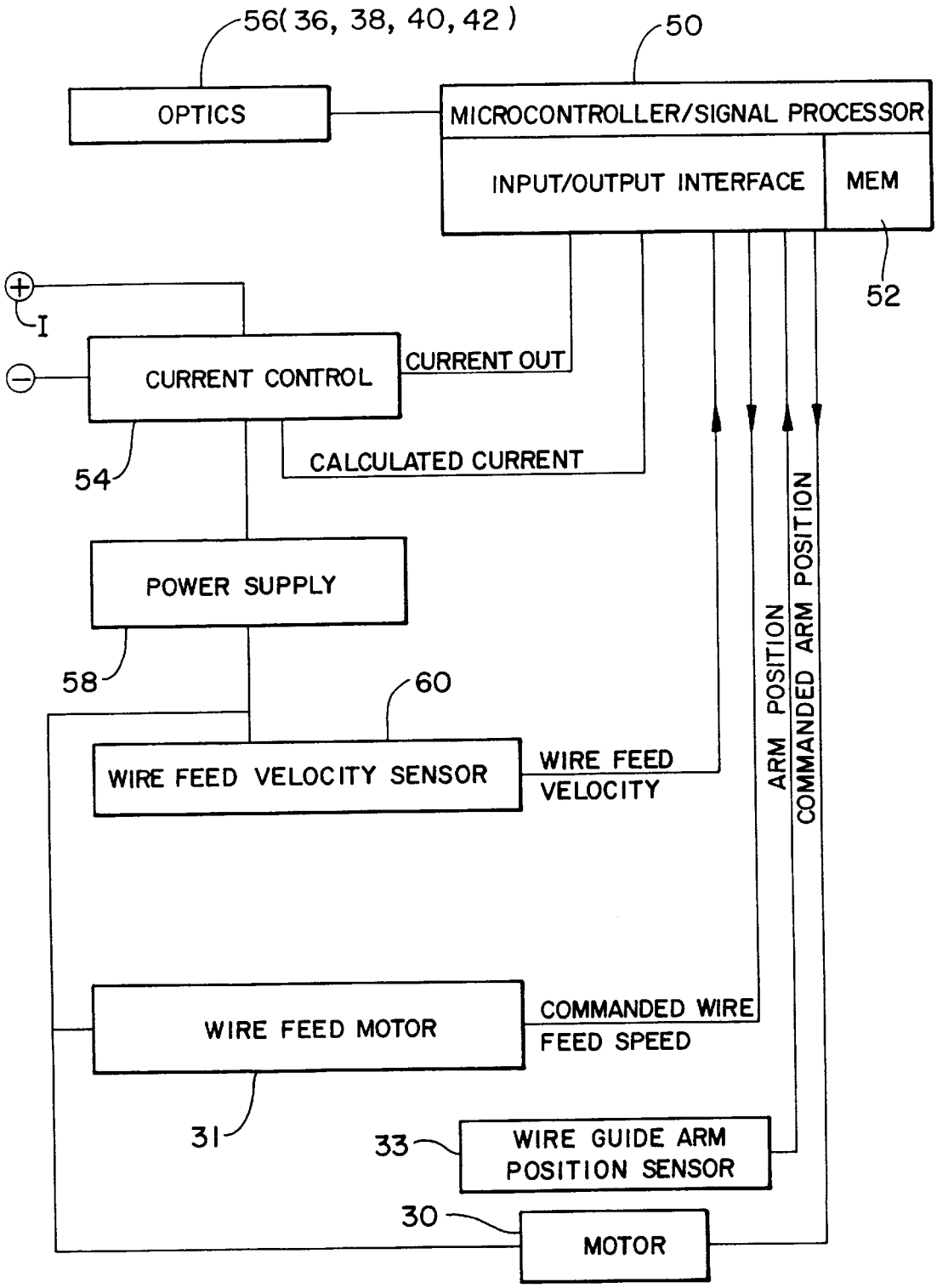
FIG. 10
AMENDED

MOMENT = AREA • CENTRIOD $$\text{CURRENT} = \frac{\text{MOMENT}}{\text{AREA}}$$

AMENDED

WELDING CONTROL USING FUZZY LOGIC ANALYSIS OF VIDEO IMAGED PUDDLE DIMENSIONS

Matter enclosed in heavy brackets [ ] appears in the original patent but forms no part of this reissue specification; matter printed in italics indicates the additions made by reissue.

*The United States Government may have certain rights in this invention pursuant to Contract No. F 33657-89-C-2232 with the Department of the Air Force.*

TECHNICAL FIELD OF THE INVENTION

This invention relates to automated GTAW (gas tungsten arc welding) using computer based signal processing and programmed logic to control welding functions, in particular, welding control using fuzzy logic analysis of video imaged puddle dimensions.

BACKGROUND OF THE INVENTION

GTAW is a widely used welding process in which an electric arc is formed by a welding torch, a shroud of inert gas, such as argon, is applied from the torch to the weld area and a weld material, such as titanium or 17-4 PH stainless *steel*, is supplied as a relatively thin wire. The weld and filler material forms a so-called "puddle" in the weld area, e.g., the space or joint between two pieces. The characteristics of the puddle are dependent on the type of wire, weld material, thickness and heat sink properties. Stainless steel is known to produce a weld bead that has waves or ripples to the eye. Titanium flows more easily, producing a generally smooth weld bead.

The characteristics of the puddle indicate the integrity of the weld in the sense that if the arc is too hot, the puddle will be larger. The temperature of the arc is determined by the arc current. The current heats the work-piece and the size of the puddle is a function of the temperature in the weld area. More current is needed to maintain the work-piece weld area at a given temperature as the work-piece gets thicker, and conversely, if the material thickness decreases, the weld area will get hotter. This can lead to changes in puddle width, indicating the change in the materials thickness. Thus, the weld characteristics will change as the work-piece's thickness changes. Even small changes in the thickness can produce undesired changes in the weld strength, not to mention, that uneven heating can produce local variations in material qualities of the workpiece, because areas that are heated to a higher temperature may undergo slightly more removal of important material components. An ideal weld provides a uniform weld bond and minimal material damage.

Experienced welders know those characteristics and visually inspect the weld puddle during the welding process. In a totally manual process, a welder controls the current input as well as the torch height and the amount of wire. The welder slowly moves the welding torch along the joint manually controlling the time spent, wire feed rate and arc intuitively to achieve what visually appears to be a uniform puddle with the correct dimensions.

Automated GTAW, also in use, attempts to provide more uniform welds by controlling temperature, motion of the head and wire feed rates. For example, U.S. Pat. No. 4,724,302, describes [a] an automated welding process that maintains certain bead dimensions within specified ranges to achieve proper weld strength. There, the system employs a method of automatically controlling a weld bead (puddle) based on the characteristics of the bead height and width using interpolated values of bead height and width. For the most part, this approach typifies those that employ Boolean logic, one in which a particular object, for example a variable, is or is not a member of a given set of parameters. Traditional systems, in other words, have used rigid "set theory" using crisp values.

Welding is an area of technology that is particularly suited to approaches that do not use rigid Boolean set theory, but instead uses set theory in which a particular parameter has a degree of membership in one or more groups. This approach imitates human thinking and is called "fuzzy logic", in contrast with rigid Boolean logic that is the foundation of tradition computational control systems.

Fuzzy logic was introduced by Zadeh in 1965, and, generally speaking, deals with such inherently fuzzy human concepts as "very, most, few" but as applied in a rigid mathematical framework. This may be called "fuzzy subset theory". The application of fuzzy logic to systems that have used Boolean set theory in the past, has produced the fast growing field of so-called "artificial intelligence". The objective of these systems it to [capturing] *capture* the knowledge of the human expert in a particular problem area, representing it in a modular, expandable structure and transferring it to others. The process involves considering the questions of process physics, knowledge acquisition, knowledge representation, inference mechanism, control strategies, user interfaces and uncertainty. The issue of uncertainty, which human knowledge intuitively always considers, is the essential issue in the design of fuzzy logic systems, and for a simple reason, much of the information in the knowledge base of a human is imprecise, incomplete or not entirely reliable—in other words, uncertain. For instance, in GTAW, the weld quality is the desired end but is reflected in some way, not precisely known or understood, in the puddle dimensions.

The harsh, small and unusual environment in which welding takes place presents vexing problems in effectively applying a fuzzy logic based process control approach. For example, problems arise in sensing or detecting the characteristics of a molten metal puddle in the presence of an electric and an inert gas cloud.

DISCLOSURE OF THE INVENTION

The objects of the present invention include providing an improved GTAW welding system using fuzzy logic control with a reliable way to measure the puddle and a flexible way to apply the weld wire into the puddle.

According to the present invention, optical snapshots are made of the puddle during welding through a camera mounted in the weld torch. These snapshots are optically filtered to identify the puddle from the surrounding workpiece. The puddle is optically scanned and digital signals are produced which represent the weld puddle dimensions. Those dimensions arm processed to determine their degree of fit in defined membership functions. Weld current levels are assigned to different degrees of fuzzy membership functions based on puddle dimensions, such as "big positive", meaning a decrease in current is needed because the puddle is very big, or "big negative", meaning a current increase is needed because the puddle is very small. Each membership function is defined by several parameters. The membership functions over-lap (following conventional fuzzy logic principles). A "moment" value, a "centroid" and an "area" are assigned to each membership function. The relationship between these is:

$$\text{Moment}=\text{Centroid}\cdot\text{area} \quad (1)$$

The area for each membership function is the same. Each membership function is defined by a range for a paddle dimension. For instance, each membership function is defined by an x value that defines a dimension (width or length) calling for a big decrease in current and a degree of membership or fit in the function for that dimension as an associated y coordinate. For a particular measured puddle dimension, the "degree of fit" is the alpha ($\alpha$) value, a value is then applied to each rule using preset values for "moment" and "area" for the rule to yield current values:

$$\text{Current moment}=\alpha\cdot\text{moment} \quad (2)$$

$$[\text{Current area}=\alpha\text{area}]\ \textit{Current area}=\alpha\cdot\textit{area} \quad (3)$$

Total current is then compared to the actual current to produce an error that is used to modify the actual current to achieve the total current.

$$\left[\text{Total Current}=\frac{\text{current}\cdot\text{moment}}{\text{current}\cdot\text{area}}\right]$$

$$\textit{Total Current}=\frac{\textit{current moment}}{\textit{current area}} \quad (4)$$

According to the present invention, additional fuzzy logic subsets are used for puddle length and the current area and current moment are computed from each of those sets in which the measured dimensions fall. For example, the puddle width may be BN (very narrow, calling for a big increase in current) but the length may be BP (very wide, calling for a big decrease in the current). By computing the alpha for each rule in which the measured dimension falls, and selecting one of the alpha values, the moment and area for the rule are determined, the total current being determined from the sum of all moments and areas for rules that are selected (that "fire").

According to the invention, there are five rules used for titanium welding with filler addition and twenty-five rules for stainless steel with filler addition.

According to the invention, the weld torch contains a wire feed that may be the weld puddle during the weld process to adjust the wire feed position relative to the weld direction. The head contains a gear system coupled to a servo motor.

According to the invention, a plurality of puddle values for length and width are obtained from the optical view of the puddle. Some of these values are discarded in-a computational process that determines the centerline of the puddle based upon the distribution of the puddle widths over several successive scans.

Among the features of the present invention is that it provides an extremely precise and repeatable weld and minimizes excessive [energy] *weld* input temperatures. Another feature is that the invention provides a versatile wire feed arrangement for robotic GTAW welders.

Other objects, benefits and features of the invention will be apparent to one of ordinary skill in the art from the following.

BRIEF DESCRIPTION OF THE DRAWING

FIG. 10 is a simplified block diagram of the control weld control functions embodied by the present invention.

[FIGS.] *FIG.* 12 is a flow chart showing the steps for computing weld current using the fuzzification and defuzzification signal processing as taught by the present invention.

BEST MODE FOR CARRYING OUT THE INVENTION

Fuzzy Logic Rules for two different metals

The use of adjectives to describe a problem is one key to fuzzy logic's ability to accommodate ambiguity. Adjectives describe an application's fuzzy aspects. For example, what does a person mean when using terms like "small", "large" or "O.K."?

Membership functions and rules provide the ability to handle [complete combinations] *complex relationships* easily, which is an important benefit of fuzzy logic. An application's rules and membership functions also contain the expert's knowledge about a system.

The adjectives used to formulate rules are more rigorously defined in the application's membership functions. The shapes of the membership functions are generally triangular and trapezoidal. When a processor scans an application's rule base, it tests each rule to determine whether its IF conditions have been satisfied. When the if conditions are met, execution branches to the rule's THEN path and the rule then "fires".

The control system's logic may be fuzzy, but measured inputs from a physical system, and the outputs required to control it will be precise. Precise values in fuzzy logic systems are termed "crisp".

During program execution of a fuzzy system, several rules may fire and contribute to the output. The output values mast then be resolved to yield a crisp value. To derive a precise value from multiple rule executions, a method called "defuzzification"—obtaining a crisp output value from a group of membership functions—is used. The defuzzification method used in the welding system is the "centroid" or "center of gravity" method. The method requires overlaying the portions of output membership functions produced by several rules and calculating the center of gravity of the resulting [shaped] *shape* as the final output value.

Fuzzy logic is an extension of traditional Boolean logic, while Boolean logic requires a statement or condition to be either completely TRUE or completely FALSE. Fuzzy logic allows partial truth and potential falseness.

Fuzzy logic is derived from the more general theory of fuzzy sets. Functions in a welding system are created relating "measured weld puddle widths" to "acceptable weld puddle widths". Thus, it can be calculated that the measured weld puddle width is 60% TRUE and 40% FALSE, for example.

An assertion being simultaneously TRUE and FALSE is often a difficult concept for someone used to working with Boolean logic, but *the* world tends to be more "gray" than "black and white". Using fuzzy sets to represent the weld puddle widths, it then can be said that the function relating to acceptable width is a curve relating to a degree of membership in the fuzzy sets defined.

Using only puddle width

Figure 1:
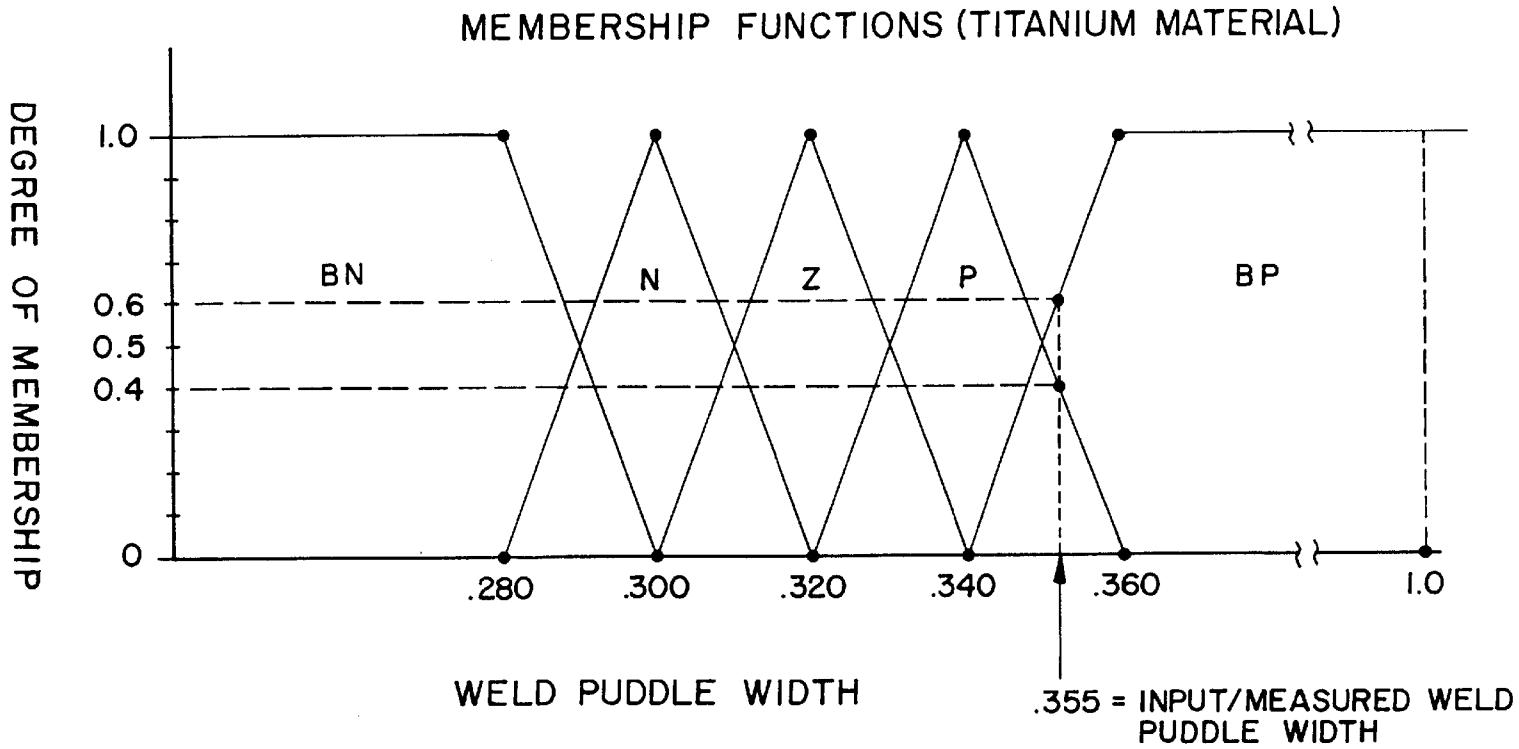
FIG. 1 is fuzzy logic membership function definitions that are used to determine weld current based on puddle width according to the present invention.

As an example, there are five titanium rule sets, according to the invention, which map as shown in FIG. 1:

Rule 1:

If measured weld puddle width is BN (big negative) THEN current is BP (big positive).

Rule 2:

If measured weld puddle width is N (negative) THEN the current is P (positive).

Rule 3:

If measured weld puddle width is Z (O.K.) THEN the current is Z (O.K.).

Rule 4:

If measured weld puddle width is P (positive) THEN the current is N (negative).

Rule 5:

If measured weld puddle width is BP (big positive), THEN current is BN (big negative).

These rules overlap as shown in FIG. 1, which show the five membership functions based on weld puddle width and degree of membership.

EXAMPLE 1

Using Only Width

Referring to FIG. 1, if the measured weld puddle width that is measured using the coaxial vision system is 0.355 wide, this measured puddle width value maps to two membership functions: P(positive) [an] *and* BP(big positive). As shown the "P" and "BP" membership functions are defined as follows:

P=0.320 to 0.360

BP=0.340 to 1.00

Two membership functions are operated on in this example: the 0.355 [measure] *measured* puddle width maps to the degree of membership of 0.4 for [BP] *P* and 0.6 for [P] *BP*. The 0.4 and 0.6 indicates the degree of membership for each fuzzy logic membership function that the 0.355 maps into. Therefore, the actual measured width belongs to two membership functions or membership sets.

When two membership functions are involved, the membership function uses an average, weighted by the respective degree of membership values to calculate the crisp or defuzzified output.

Following through with the example above, the crisp current output value (the defuzzified value) I is calculated as follows, where dgm. means degree of membership, mn. means moment:

$$\left[I = \frac{(\text{Pdgm}\cdot\text{Pmn}) + (\text{BPdgm}\cdot\text{BPmn})}{(\text{Pdgm cdotP' sarea}) + (\text{BPdgm}\cdot\text{BParea})}\right]$$

-continued $$I = \frac{(Pdgm\cdot Nmn) + (BPdgm\cdot BNmn)}{(Pdgm\cdot Narea) + (BPdgm\cdot BNarea)} \quad (5)$$

Basic defuzzification formula to solve for weld current

The area and the moment definition are application specific and are dependent on the process physics, materials, and the welded process control equipment. For welding titanium the moments and area are defined as follows:

| Membership Function | Moment | Area |
|---|---|---|
| BN | −2.0 | 2.0 |
| N | −1.0 | 2.0 |
| Z | 0 | 2.0 |
| P | 1.0 | 2.0 |
| BP | 2.0 | 2.0 |

Finally, the defuzzified output is then added to the actual current to achieve the new required current.

$$\text{New current=actual current+defuzzified current} \quad (6)$$

The new current value is used to adjust the systems current output using feedback control, as described below.

Using length and width

In the case of the 17-4 PH material, the rule sets become more complicated because the length of the weld puddle and the width of the weld puddle are used in the fuzzy logic calculation. Also, an intersection of sets of the degree of membership is incorporated in the calculations.

Figure 2:
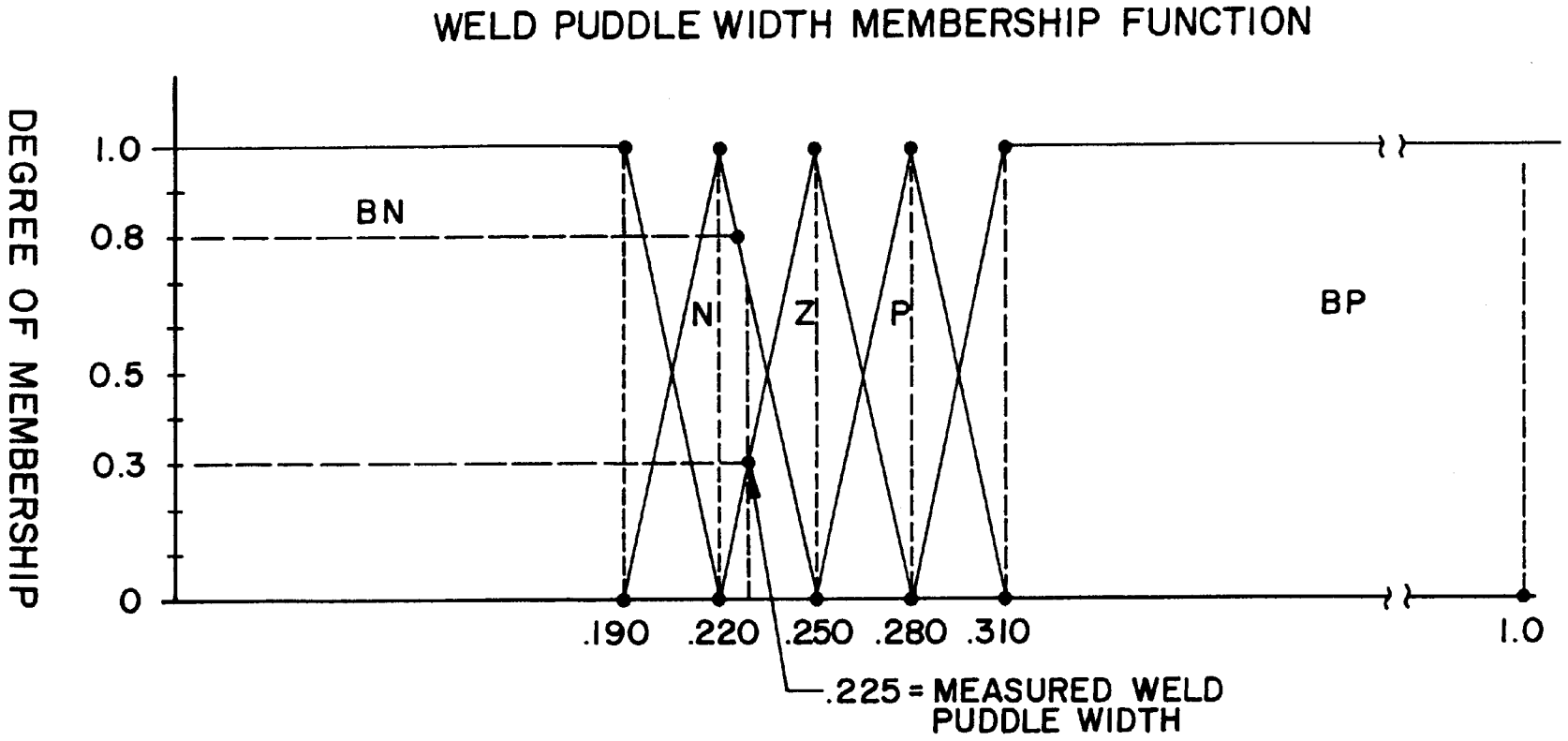
FIGS. 2 and 3 are fuzzy logic membership function definitions that are used to determine weld current based on puddle width and length according to the present invention.
Figure 3:
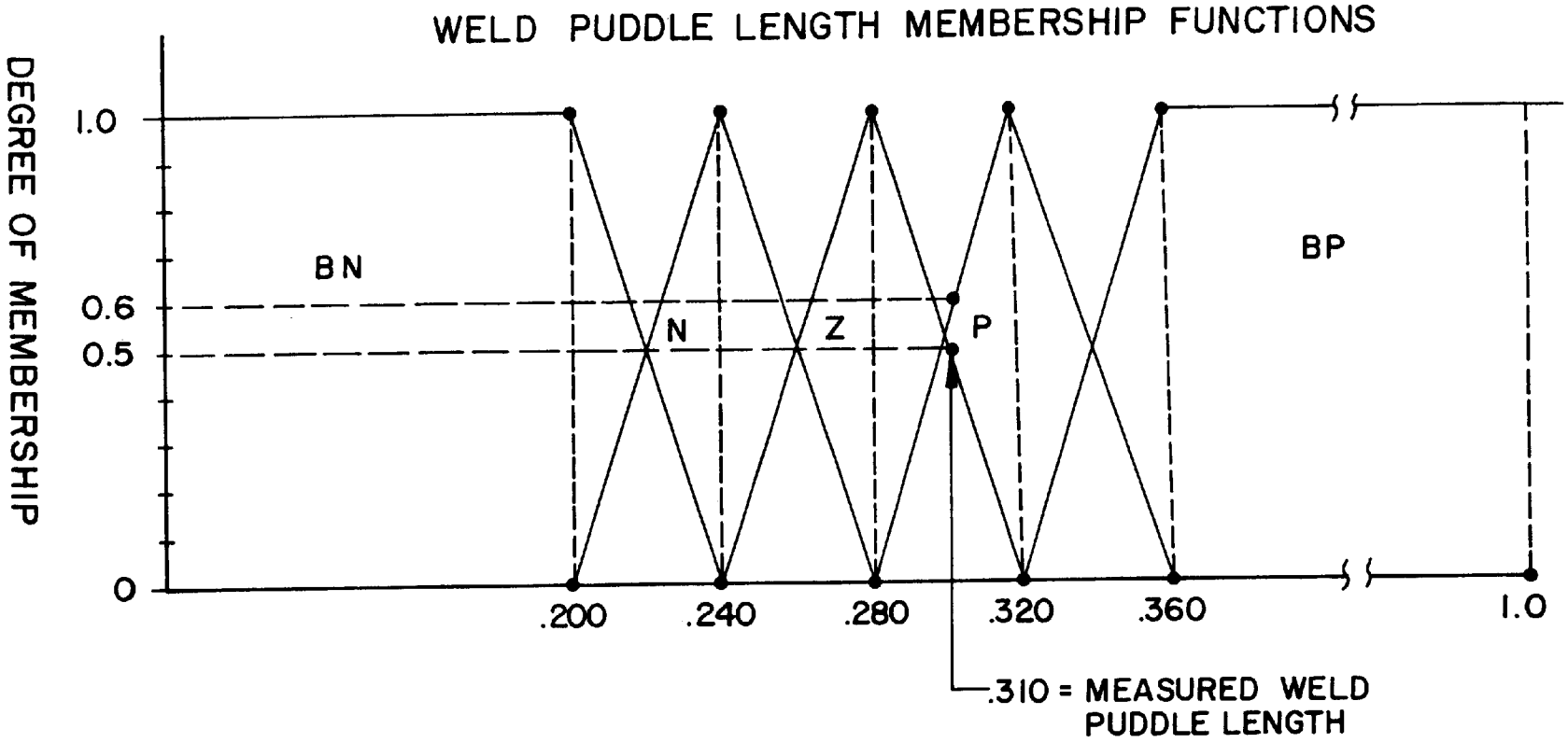
Figure 5:
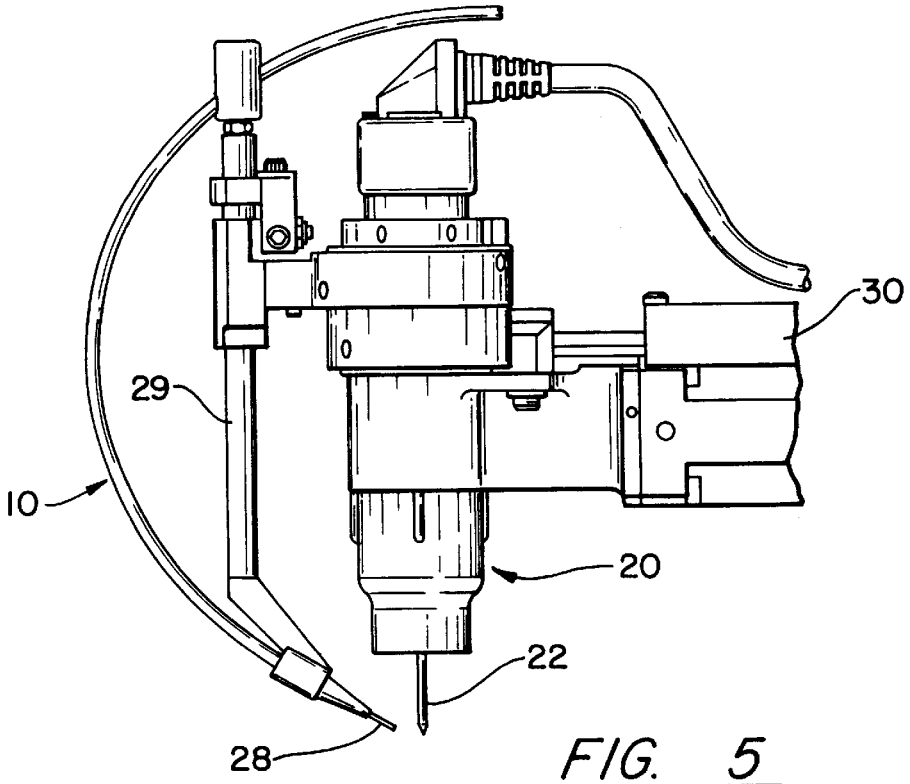
FIG. 5 is a an elevation of a GTAW welding torch embodying the present invention.

The 17-4PH rule sets are as follows, as defined from FIGS. 2 and 3

Rule 1:

IF the measured weld puddle width is BN and the measured weld puddle length is BN, THEN current is BP.

Rule 2:

IF the measured weld puddle width is BN and the measured weld puddle length is N, THEN current is P.

Rule 3:

IF the measured weld puddle width is BN and the measured weld puddle length is Z, THEN current is P.

Rule 4:

IF the measured puddle width is BN and the measured weld puddle length is P, THEN current is P.

Rule 5:

IF measured weld puddle width is BN and measured weld puddle length is BP, THEN current is P.

Rule 6:

IF measured weld puddle width is N and measured weld puddle length is BN THEN current is P.

Rule 7:

IF measured weld puddle width is N and measured weld puddle length is N, THEN current is P.

Rule 8:

IF measured weld puddle width is N and measured weld puddle length is Z, THEN currant is P.

Rule 9:

IF measured weld puddle width is N and measured weld puddle length is P, THEN current is Z.

Rule 10:

IF measured weld puddle width is N and measured weld puddle length is BP, THEN current is Z.

Rule 11:

IF measured weld puddle width is Z and measured weld puddle length is BN, THEN current is Z.

Rule 12:

IF measured weld puddle width is Z and measured weld puddle length is N, THEN current is Z.

Rule 13:

IF measured weld puddle width is Z and measured weld puddle length is Z, THEN current is Z.

Rule 14:

IF measured weld puddle width is Z and measured weld puddle length is P, THEN current is Z.

Rule 15:

IF measured weld puddle width is Z and measured weld puddle length is BP, THEN current is N.

Rule 16:

IF measured weld puddle width is P and measured weld puddle length is BN, THEN current is Z.

Rule 17:

IF measured weld puddle width is P and measured weld puddle length is N, THEN current is Z.

Rule 18:

IF measured weld puddle width is P and measured weld puddle length is Z, THEN current is Z.

Rule 19:

IF measured weld puddle width is P and measured weld puddle length is P, THEN current is N.

Rule 20:

IF measured weld puddle width is P and [light] *length* is BP, THEN current is N.

Rule 21:

IF measured weld puddle width is BP and measured weld puddle length is BN, THEN current is BN.

Rule 22:

IF measured weld puddle width is BP and measured weld puddle length is N, THEN current is N.

Rule 23:

IF measured weld puddle width is BP and measured weld puddle length is Z, THEN current is N.

Rule 24:

IF measured weld puddle width is BP and measured weld puddle length is P, THEN current is BN.

Rule 25:

IF measured weld puddle width is BP and measured weld puddle length is BP, THEN current is BN.

EXAMPLE 2

Using Length and Width

The following example will demonstrate the use of these rules for 17-4 PH stainless *steel* or any other material producing a puddle with observable length and width that are indicative of the weld quality in a real time mode.

Assume that the observed weld puddle length=0.310 and the measure weld puddle width=0.225. Using the membership functions in FIGS. 2 and 3, the 0.310 weld puddle length maps as follows: It has two fuzzy logic membership functions. Rule 1) the weld puddle length is in P with a membership of 0.6 and Rule 2) the weld puddle length is also in Z with a membership there of 0.5. For the weld puddle width of 0.225, the width maps to two fuzzy logic membership functions as well: Rule 3) in the function for Z, with a degree of membership there of 0.3 and Rule 4) in the function N, with a degree of membership of 0.8. In this case these four (4) out of the above twenty five (25) rules will fire: Rule 8, 9, 13, and 14. The computation for current assumes these notations: min=the minimum value function (alpha)

min = the minimum value function (alpha)
MPW_X
  MPW = the measured puddle width
  _X = the mapped weld puddle width membership function
MPL_X
  MPL = the measured puddle length
  _X = the mapped puddle length membership function
Imoment_X
  I = current
  moment_X = the weld current membership function
Iarea_X
  I = current
  area_X = the weld current membership function Table of _X Notations
BN = Big negative
N = Negative
Z = Zero
P = Positive
BP = Big Positive For each rule, individual elements or components ($\mu_{m(moment)}$ and $\mu_{a(area)}$ of the total area and moment for the total current are computed for those rules that "fire", for example:

| | |
|---|---|
| Rule 8: | $\mu_{m8}$ = (min(MPW_N, MPL_Z) × (Imoment_P)) |
| | $\mu_{a8}$ = (min(MPW_N, MPL_Z) × (Iarea_P)) |
| Rule 9: | $\mu_{m9}$ = (min(MPW_N, MPL_P) × (Imoment_Z)) |
| | $\mu_{a9}$ = (min(MPW_N, MPL_P) × (Iarea_Z)) |
| Rule 13 | $\mu_{m13}$ = (min(MPW_Z, MPL_Z) × (Imoment_Z)) |
| | $\mu_{a13}$ = (min(MPW_Z, MPL_Z) × (Iarea_Z)) |
| Rule 14 | $\mu_{m14}$ = (min(MPW_Z, MPL_P) × (Imoment_Z)) |
| | $\mu_{a14}$ = (min(MPW_Z, MPL_P) × (Iarea_Z)) |

In these expressions, the degree of membership for each dimension is mapped to appropriate membership functions for the measured length and width and the lesser of the two (the "min" expression) is selected as a multiplier for the moment and area for the function. From those values, the "crisp" or "defuzzified" current value (I) is computed:

$$I = \frac{\mu m8 + \mu m9 + \mu m13 + \mu m14}{\mu a8 + \mu a9 + \mu a13 + \mu a14} \tag{7}$$

From this value, the new current is the sum of the actual current and the crisp value:

$$\text{New current=actual measured current+I} \tag{8}$$

System Operation

Figure 4:
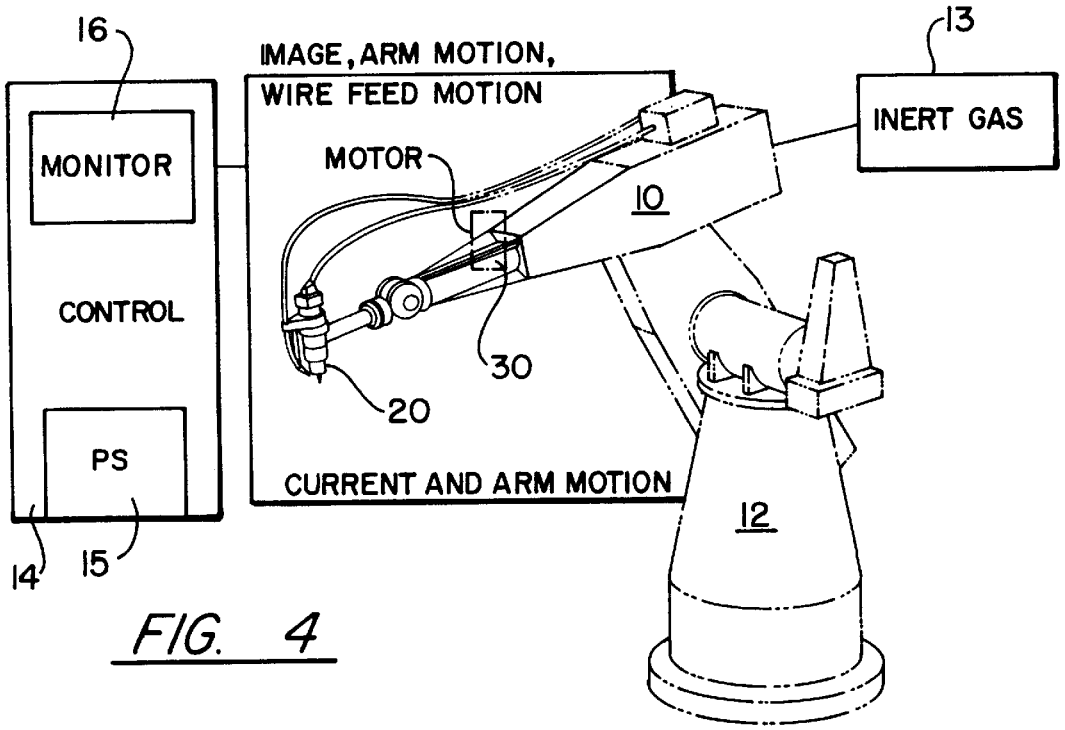
FIG. 4 is a schematic of a robotic welder embodying the present invention.
Figure 7:
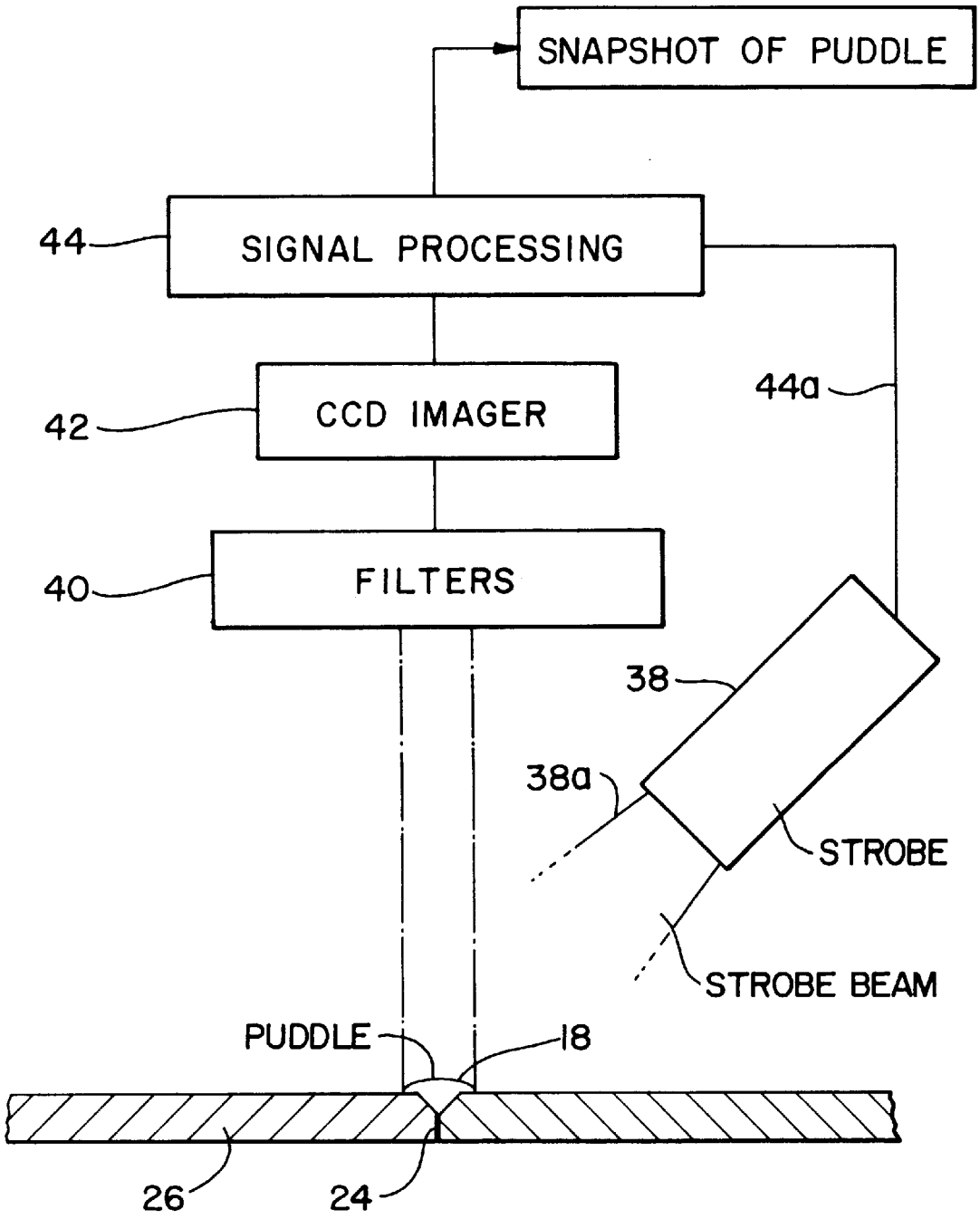
FIG. 7 is a function block diagram of an imaging system for providing signals indicating puddle width and length according to the present invention.
Figure 8:
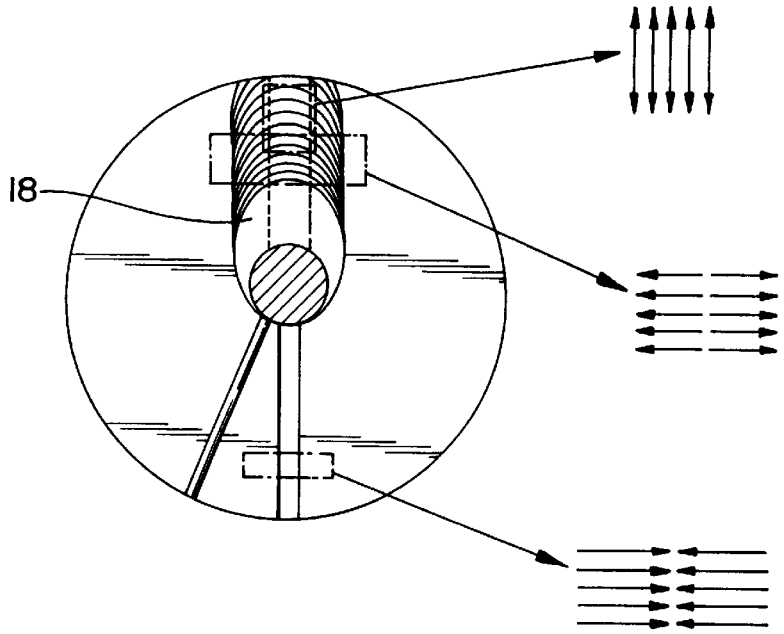
FIG. 8 shows a frame of a puddle as imaged according to the present invention.
Figure 9:
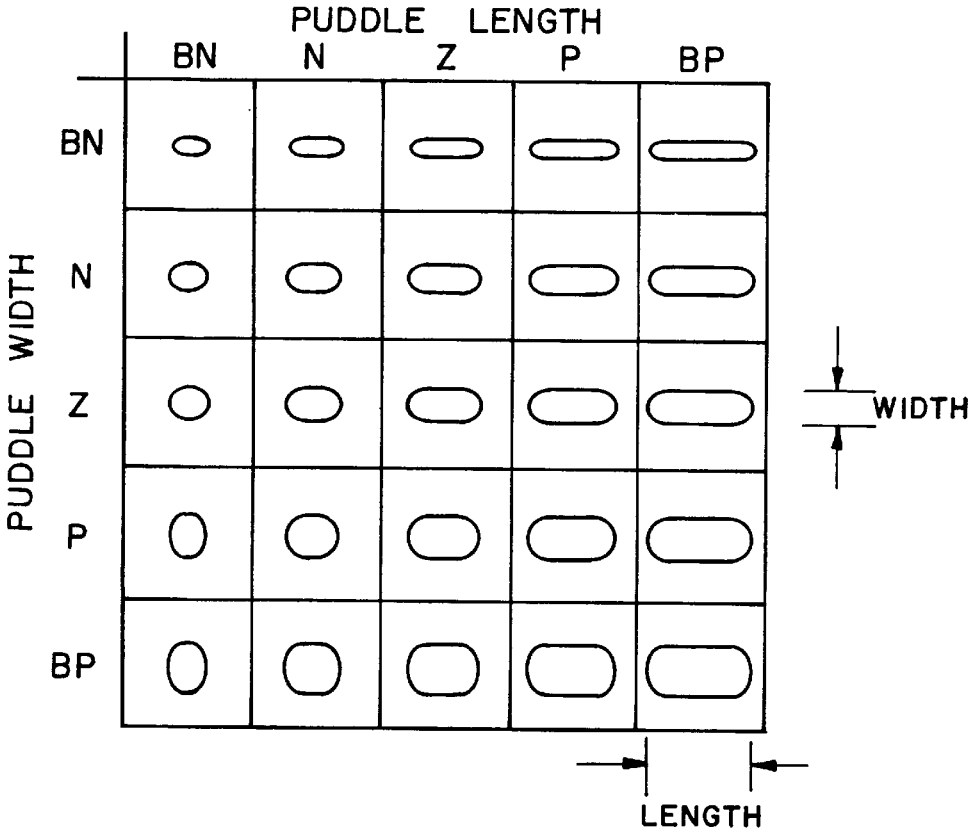
FIG. 9 is a table showing different puddle geometries and the associated fuzzy logic rules used in the present invention based on those geometries.

FIG. 4 shows a robotic welding arm 10 on a base *12* and a controller 14 that includes a monitor 16 for providing real-time graphic information of weld operation, such as the view of the weld puddle shown in FIG. 8. A weld (e.g., GTAW) torch 20 (see also FIG. 6) is located at the end of the arm 10, and includes an electrode 22 for providing the arc current that heats a joint 24 on a work-piece 26. Inert gas is supplied around the electrode 22 from a supply 13. The current is provided from a power supply [(Ps)] (*PS*) 15, which is controlled by the controller to produce the required current according to the fuzzification and defuzzification process explained previously and the basic program steps described below:

Weld wire 28 is fed from a line feed motor 31 through a rotatable wire feed arm 29, melting to form the puddle, which has a rippled or wavy pattern as shown, the characteristic of 17-4 *PH* weld material. (When Titanium is used the puddle is generally smooth.) Optical filters 40 lie in the path between the camera and the work-piece, as illustrated in FIG. 7. A second motor 30 rotates and, through the gears 32 and 34, rotates wire guide arm 29, whose position is sensed by a position sensor [31] *33* coupled to the arm (e.g. circular gear rack and pinion, as shown, or a timing belt) around a torch optics section 36, which contains, as shown in FIG. 7, a strobe 38, optical filters 40 and a charge coupled (CCD) video camera 42. The filters narrow the bandwidth of the optical and infra red energy that reaches the camera, mainly limiting the energy to light in the wavelength range of the strobe 38. Strobe light is pulsed at a frequency determined by a strobe signal SS from a signal processor (not shown in FIG. 4, but 50 in FIG. 10) on the line 44a. In terms of the optics, the result is the snapshot of the weld puddle as shown in FIG. 8, which may have any of the characteristics, over several snapshots, of length and width shown in the fuzzy logic rules shown in FIG. [8] *9*.

Figure 11:
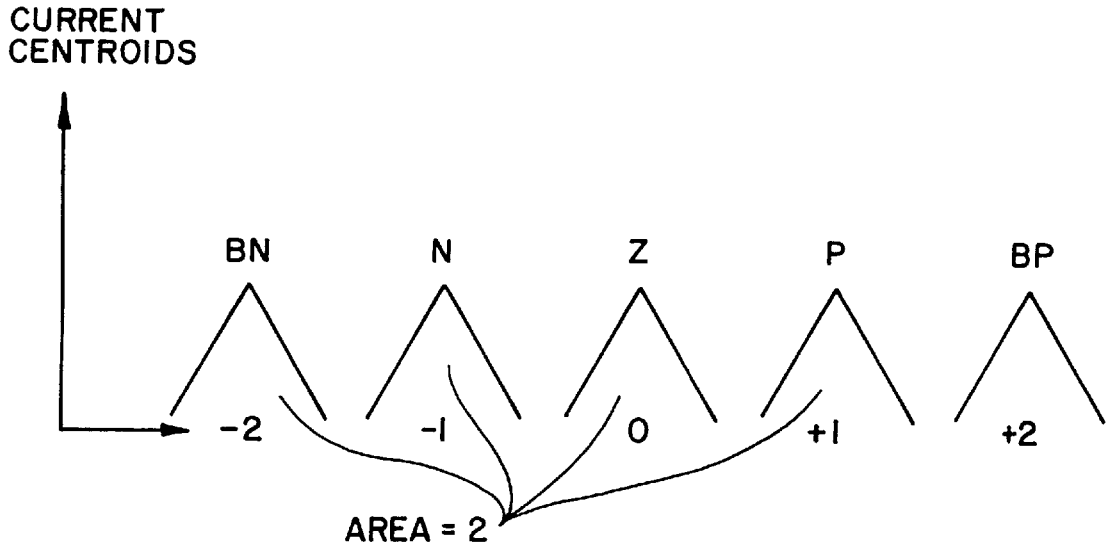
FIG. 11 is a table showing "moments" and "areas" for "fuzzyifying" and "defuzzifying" the required weld current according to the present invention.

With the aid of FIG. 10, it can be additionally observed that the overall system includes a microcontroller/signal processor 50 with a memory (MEM) 52 to store retrievable values corresponding to 1) the membership function shown in the fuzzy logic table (FIGS. 1, 2 and 3); and 2) the area and moment of each set BN, N, Z, P and BP (FIG. 11). The signal processor 50 also includes an input/output section or interface for signal transceiving. The microcontroller receives from the current control 54 a signal, Current Out, indicating the weld current I, and provides a signal, Calculated Current, which is generated using the fuzzification and defuzzification signal processing described above based on the strobed image produced from an optics section 56. The current is provided from a power supply 58. A signal, Wire Feed [Position] *Velocity*, is provided from a wire feed position sensor 60. The motor 30 receives a signal, Commanded [Wire Feed] *Arm* Position, to place the wire feed *arm* in a desired location at which the difference between the [wire feed] *arm* location signal and the commanded [wire feed] *arm* location is zero.

Figure 6:
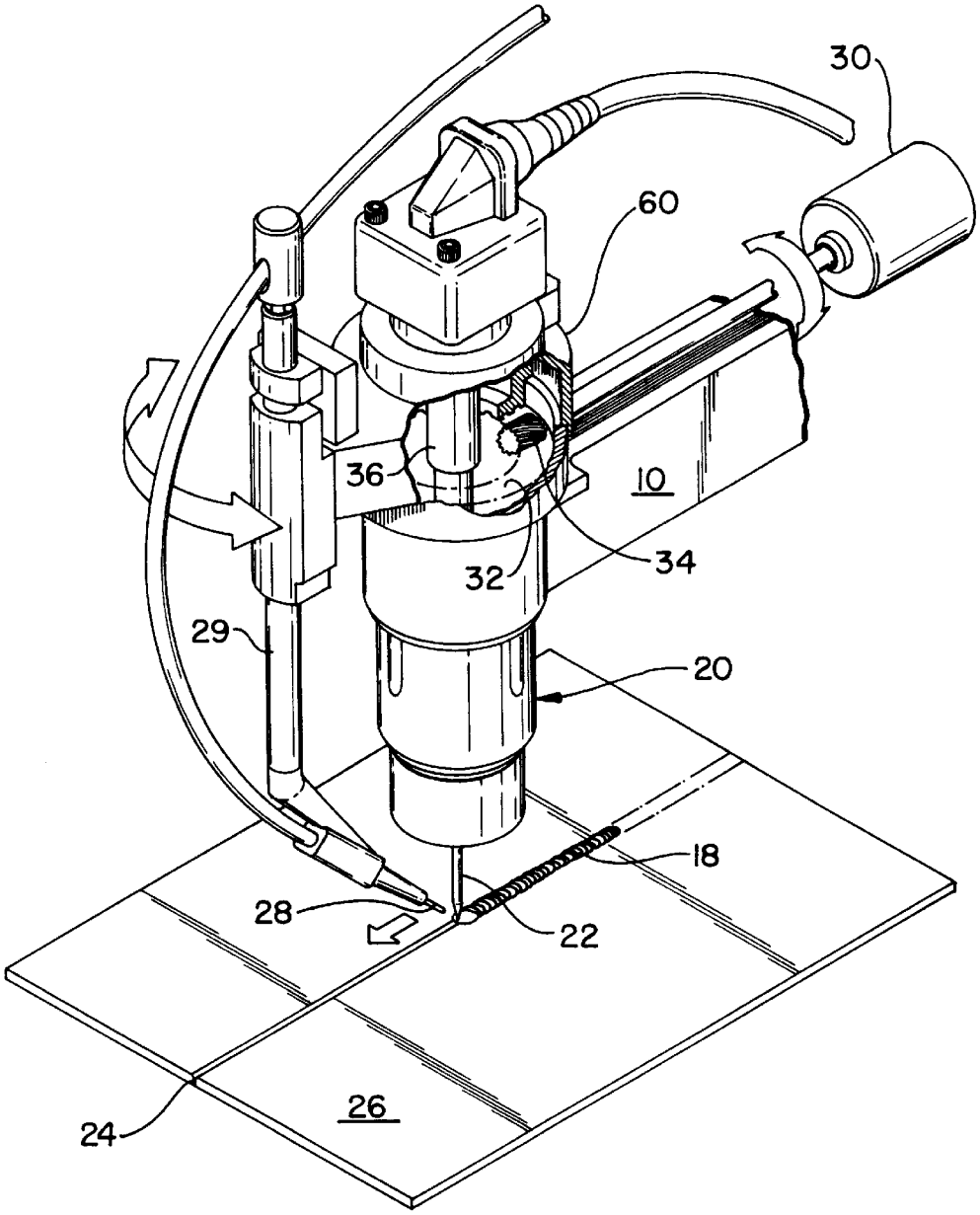
FIG. 6 is a perspective view of the torch shown in FIG. [2] 5 that includes a cut-away portion exposing wire feed transmission and feed through optics embodying the present invention.
Figure 12:
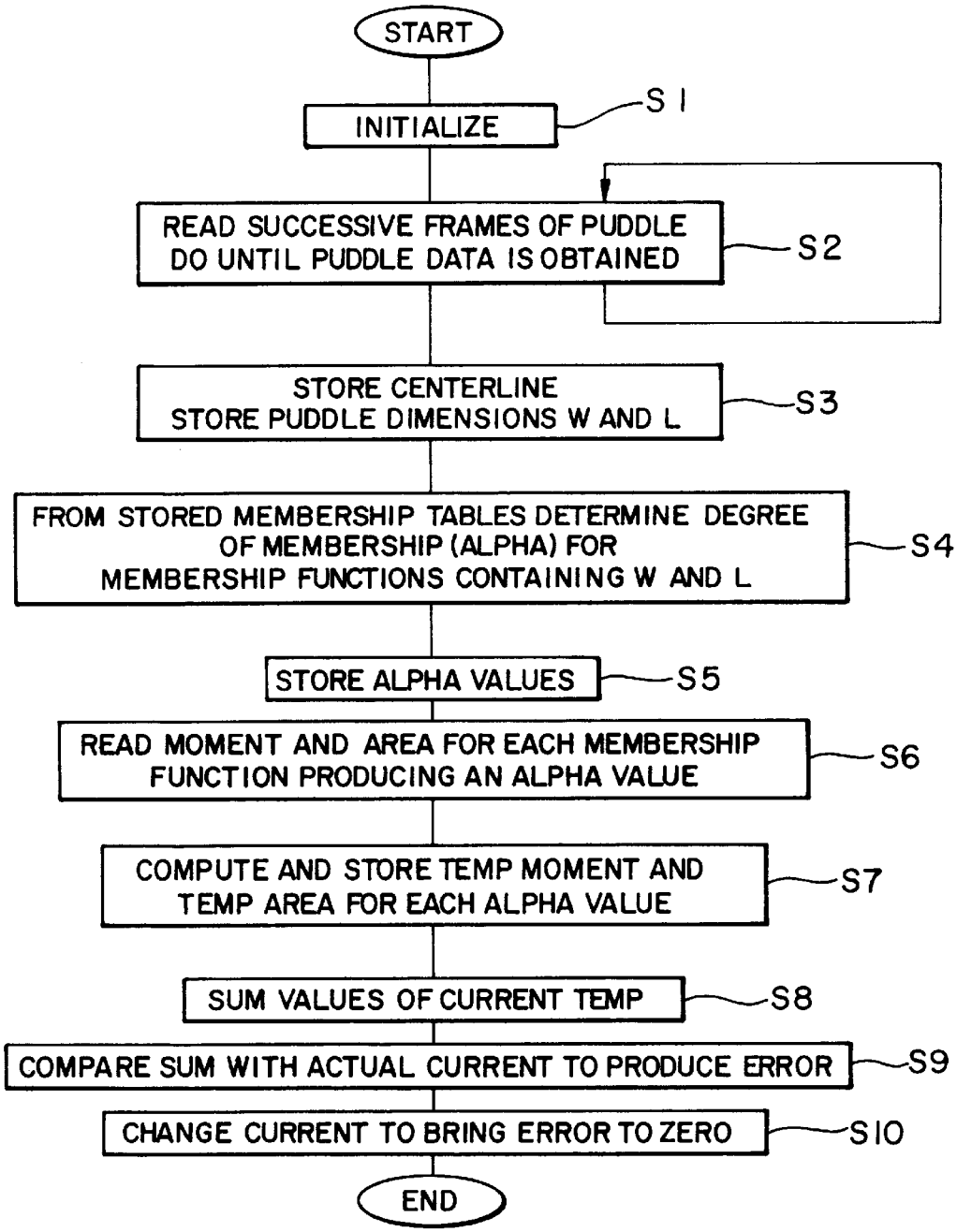

The flow-chart shown in FIG. 12, illustrates the steps employed by the system controller, through the signal processor [14] *50* using the previously described fuzzification and defuzzification relationships when welding the seam 18 in FIG. 6. After an initialization step S1, a number of flames of the puddle are obtained through successive strobing, providing puddle dimension data in step S2, for instance the length [an] *and* width described in above example 2. In step 3, the puddle width data is processed to yield the puddle centerline base [up] *upon* the range of puddle width. At the following step S4, the membership tables, e.g., FIGS. 1, 2 and [2] *3* are addressed by mapping the length and width to the membership functions, producing the degree of membership or alpha values. These values *are* stored in step S5, and in step S6 the area and moment for each function with an alpha greater than zero is recalled. At step S7, the current [I] *area and moment* for each function with an alpha greater than zero is computed using [equation 6] *equations 2 and 3* and the steps described[,] in either example 1 or 2 above. The values for I are summed in step *S8* and the sum or total is compared with the actual current (current out in FIG. 10) in step S9, producing an error signal, which the signal processor 50 uses in step S10 to compute the required change in current to bring the error to zero in step S9.

One of ordinary skill in the art, having the benefit of this discussion of the invention and its embodiments, may be able to make modifications, in whole or in part, to those embodiments without departing from the true scope and spirit of the invention.

We claim:

1. A welder comprising a welding torch on a controlled robotic arm, imaging means in the torch, a wire feeder on the torch and a weld controller for controlling the position of the torch and electric current supplied by the torch, characterized in that:

the weld controller comprises signal processing means for producing a first signal indicating a weld dimension in response to an output signal from the imaging means produced by the weld puddle; for providing from a plurality of stored logic sets and in response to the first signal a second signal indicating a degree of membership in a first set calling for a first current change and a third signal indicating a degree of membership in a second set calling for a laser change in current; for providing a fourth signal that represents the product of the second signal and a first stored area value [associated with said fist set]; for providing a fifth signal that represents the product of the third signal and a second stored area value [associated with the second set]; for providing a sixth signal that represents the product of the second signal and a *first* moment value [for the first set]; for providing a seventh signal that represents the product of the third signal and a *second* moment value [for the second set]; and for providing an eighth signal that represents the [value] *sum* of the sixth signal *and the seventh signal* divided by *the sum of* the [seventh] *fourth* signal *and the fifth signal* to initiate a change in the electric current.

2. The welder described in claim 1, further characterized in that: there are five of said stored logic sets, a first set defining an increase in current of a first level for a first range of puddle dimensions, a second *set* defining an increase in current of a second level, less than the first level, for a second range in puddle dimensions including some of the dimensions in said first range, a third [range] *set* indicating no change in current for a third range of dimensions including some of the dimensions in said second range, a fourth set defining a decrease in current of said second level for a fourth range of puddle dimensions including some of the dimensions in said third range; and a fifth set defining [an] *a* decrease in current of said first level for a fifth range of puddle dimensions include some dimensions in said fourth range.

3. The welder described in claim 1, further characterized in that the dimension is puddle width.

4. The welder described in claim 1, further characterized in the wire feed is rotatable about the axis of the weld torch and includes a servo drive responsive to signals from the signal control to index the wire feed to locations on opposed sides of the puddle.

5. The welder described in claim 1, further characterized in that the imaging means providing successive video frames of the puddle and the signal processing means comprises means for determining the centerline of the puddle from said images to provide a first centering signal for centering the weld torch over the puddle.

6. A welder comprising a welding torch on a controlled robotic arm, imaging means in the torch, a wire feeder on the torch and a weld controller for controlling the position of the torch and electric current supplied by the torch, characterized in that:

the weld controller comprises signal processing means for producing a first signal indicating a weld puddle length and width in response to an output signal from the imaging means from the weld puddle, for providing from a plurality of stored logic sets and in response to the first signal a second signal indicating a degree of membership in a first set calling for a first current change and a third signal indicating a degree of membership in second set calling for a lesser change in current; for providing a fourth signal that represents the product of the second signal and a first stored area value associated with the first set, and for providing a fifth signal that represents the product of the third signal and a second stored area value associated with the second set; for providing a sixth signal that represents the product of the second signal and a stored moment value for the first set; for providing a seventh signal that represents the product of the third signal and a stored moment value for the second set; for providing an eighth signal that represents the [value] *sum* of the sixth signal *and the seventh signal* divided by *the sum of* the [seventh] *fourth* signal *and the fifth signal* to indicate a change in the electric current; for storing said logic sets for different wire feed rates for different changes in current level, and for controlling the electric current in response to said eighth signal and the wire feed according to said logic sets.

7. The welder described in claim 6, further characterized in that the wire feed is rotatable about the axis of the weld torch and includes a servo drive responsive to signals from a signal control to index the wire feed to locations on opposed sides of the puddle.

8. The welder described in claim 6, further characterized in that the imaging means providing successive video frames of the puddle and the signal processing means comprises means for determining the centerline of the puddle from said images to provide a first centering signal [to] for centering the weld torch over the puddle.

9. A welder comprising a torch contains a camera that provides sequential snapshots of a weld paddle and a controller for increasing and decreasing weld current as a function of puddle dimensions, characterized in that the controller comprises:

means, responsive to [an] a puddle dimension signal from the camera indicating a puddle dimension, for summing two values for desired current change from two adjacent fuzzy logic sets defined by respective puddle dimensions and current change levels, and for changing the weld current as a function of said sum, said two fuzzy logic sets being selected from a plurality of fuzzy logic sets for possible puddle dimensions ranging from a minimum to a maximum and said two values being determined as *a* proportional function of the degree of membership in each of said two adjacent fuzzy logic sets for the puddle dimension signal.

10. A welder as described in claim 9, further characterized by a wire feeder mounted on the torch and rotatably moveable about an axis of the torch normal to the puddle.

11. The welder described in claim 10, further characterized by a motor, a shaft rotated by the motor and a transmission coupling the shaft to the feeder, the motor being operable to rotate the shaft to move the feeder.

12. The welder described in claim 9, further characterized in that the controller comprises means for generating a signal indicating a puddle centerline from a plurality of successive puddle dimensions produced in response to successive outputs from the camera and for providing a control signal to reposition the torch over said centerline.

13. An inert electric gas welder comprising an electric current torch containing means for providing an image of a weld puddle, characterized by:

signal processing means operating in successive computing cycles for determining from the image a dimension of the weld puddle, for determining from stored functions the degree of membership of said dimension in a plurality of fuzzy logic functions indicating discrete changes in weld current, said degree of membership being an alpha value, for storing a moment and area for each fuzzy logic function, for providing for each alpha value greater than a set minimum a current [temp] moment value that is the product of the alpha for the function and the moment for the membership function, for providing a current [temp moment] *area* value that is the product of the alpha for the membership function and the area for the membership function, for providing, in a discrete signal processing cycle, a first value that is the sum of each of said current [temp] moments and a second value that is the sum of each of said *current* areas, for providing, during a computing cycle, a third signal that is the value of the first value divided by the second value, and for providing a signal to the electric current torch to modify the current through the electric current torch as a function of the magnitude of said third signal.

14. The welder described in claim 13, further characterized in that there are five of said fuzzy logic functions for titanium wire welding said discrete changes comprising a big increase in current, a big decrease in current, an increase in current, a decrease in current and no change in current.

15. The welder described in claim 13, further characterized in that there are twenty-five of said fuzzy logic functions for stainless steel wire welding, said discrete changes comprising *a big increase in current,* a big decrease in current, an increase in current, a decrease in current and no change in current.

16. A welder comprising imaging means for producing image signals indicating the length and width of a weld puddle beneath the torch, characterized by:

signal processing means for providing length and width values from the image signals, for storing moment and area values for different discrete ranges of puddle length and puddle width that identify fuzzy membership functions associated with weld current levels, for selecting the membership functions associated with said length and width values, for providing a membership signal indicating the degree of membership of the length and width values in each of said selected associated membership functions, for selecting among a pair of said length and width values the one with the lowest degree of membership, for providing a moment value that is the product of said lowest degree of membership and one of the stored moment values; for providing in area signal that is the product of said lowest degree of membership and one of the stored area values, and *for* providing a current signal that represents the sum of all moment signals divided by the sum of all area signals, said current signal controlling weld current.

17. A welding method characterized by:

illuminating a weld puddle with a strobe light during welding;

providing signals indicating a weld puddle dimension based on individual video frames of the weld puddle produced from the strobe light on a video camera in a weld torch above the puddle;

storing N membership functions, each identifying a discrete change in weld current for a range of said dimensions and storing a moment value and an area value for each membership function;

providing an alpha signal for each membership function in which said puddle dimension falls, the alpha signal indicating the degree of membership of said dimension in the membership function, based on a stored value for the function and the dimension;

providing for each membership function for which an alpha value is produced, a pair of signals indicating the product of said alpha value and a moment and area stored for said membership function;

changing weld current as a function of the sum of all said pair of signals for which alpha signals are produced.

18. The method described in claim 17, further characterized in that:

a pair of alpha signals are produced for puddle length and width respectively and the alpha signal with the lowest degree of membership is selected to produce said product.

*19. A welder comprising a torch, an imaging means and a controller for controlling the weld current to the torch, characterized in that the controller comprises signal processing means for:*

*receiving signals from the imaging means for determining one or more dimensions of a weld puddle produced by the welder;*

*determining degrees of membership of said one or more dimensions in a plurality of adjacent fuzzy logic sets covering possible puddle dimensions ranging from a minimum to a maximum;*

*determining from said fuzzy logic sets for which said degrees of membership are non-zero, a plurality of possible current change amounts using a plurality of fuzzy rules; and*

*determining a current change signal from the possible current change amounts by summing current values of said rules, the current values being determined as a proportional function of said determined degrees of membership.*

*20. The welder of claim 19, wherein a width dimension of the weld puddle is determined.*

*21. The welder of claim 20, including a wire feeder which feeds titanium wire, and wherein there are five fuzzy logic rules corresponding with five puddle width fuzzy sets and providing five possible current change amounts of a big current increase, a current increase, no current change, a current decrease and a big current decrease.*

*22. The welder of claim 19, wherein both a width dimension and a length dimension of said weld puddle are determined, and wherein degrees of membership are determined for said width dimension in a plurality of width fuzzy logic sets, and wherein degrees of membership are determined for said length dimension in a plurality of length fuzzy-logic sets.*

*23. The welder of claim 22, including a wire feeder which feeds stainless steel wire, and wherein there are twenty five fuzzy logic rules corresponding with five puddle length fuzzy sets and five puddle width fuzzy sets and providing five possible current change amounts of a big current increase, a current increase, no current change, a current decrease and a big current decrease.*

*24. The welder of claim 19, wherein said current values of said rules include current moment values and current area values, said current moment values and said current area values being determined from a multiplication of at least one of said degrees of membership of said one or more puddle dimensions and a moment value or area value, respectively, associated with said possible current change amounts, and wherein said current moment values are summed together, said current area values are summed together, and said summed current moment values are divided by said summed current area values to provide said current change signal.*

*25. The welder of claim 24, wherein the current moment value and said current area value of a rule are determined by taking the minimum of the degree of membership of said width dimension in the width fuzzy set associated with the rule and the degree of membership of said length dimension in the length fuzzy set associated with the rule, and by multiplying this minimum by the moment value and current area value, respectively, associated with the current change amount of the rule.*

*26. The welder of claim 19, including a wire feeder mounted on the torch, the feeder being rotatably moveable about the axis of the torch normal to the weld puddle.*

*27. The welder of claim 26, wherein the feeder is coupled to a shaft by a transmission coupling, and wherein the feeder is driven in rotation by a motor rotating the shaft.*

*28. The welder of claim 26, and including a servo drive responsive to signals from the signal processing means to index the wire feed to locations on opposed sides of the weld puddle.*

*29. The welder of claim 19, wherein the imaging means provides successive video frames of the weld puddle, and the signal processing means comprises means for determining the centerline of the puddle from said images to provide a first centering signal for centering the torch over the puddle.*

*30. A welding method comprising the steps of:*

*illuminating a weld puddle with a strobe light during welding; and*

*providing signals indicating at least one weld puddle dimension based on individual video frames of the weld puddle produced from the strobe light on a video camera in a weld torch above the puddle;*

*characterized by the steps of:*

*storing N membership functions, each identifying a degree of membership of said one or more puddle dimensions in a plurality of fuzzy sets;*

*relating said fuzzy sets with weld current change amounts using fuzzy rules, and storing a moment value and an area for each of these current change amounts;*

*providing an alpha signal for each rule which fires, the alpha signal of a rule indicating the degree of membership of said one or more dimensions in said fuzzy sets associated with that rule;*

*providing for each rule for which an alpha value is produced, moment and area signals indicating the product of the alpha value for the rule with respectively the moment value and area value of the current change amount associated with that rule; and*

*changing the weld current as a function of the sum of said moment signals divided by the sum of said area signals.*

*31. The method of claim 30, wherein the puddle width and length dimensions are determined, and wherein said alpha signal of a rule is the lowest of the degrees of membership of the width and length puddle dimensions in the width and length fuzzy sets associated with that rule.*

* * * * *